United States Patent
Dubey et al.

(10) Patent No.: US 8,667,467 B2
(45) Date of Patent: Mar. 4, 2014

(54) DYNAMIC TEST SCRIPTS

(75) Inventors: Avaneesh Dubey, Bangalore (IN);
Pradeep Shankara, Bangalore (IN);
Ranjeetha Raja, Bangalore (IN)

(73) Assignee: SAP Aktiengesellschaft, Walldorf (DE)

( * ) Notice: Subject to any disclaimer, the term of this patent is extended or adjusted under 35 U.S.C. 154(b) by 754 days.

(21) Appl. No.: 12/843,743

(22) Filed: Jul. 26, 2010

(65) Prior Publication Data

US 2012/0023485 A1  Jan. 26, 2012

(51) Int. Cl.
*G06F 9/44* (2006.01)

(52) U.S. Cl.
USPC .......................... 717/125; 717/124; 717/126

(58) Field of Classification Search
None
See application file for complete search history.

(56) References Cited

U.S. PATENT DOCUMENTS

| | | | | |
|---|---|---|---|---|
| 5,600,789 A * | 2/1997 | Parker et al. | ................ | 714/38.11 |
| 5,781,720 A * | 7/1998 | Parker et al. | ................ | 714/38.11 |
| 7,055,137 B2 * | 5/2006 | Mathews | ........................ | 717/125 |
| 7,272,822 B1 * | 9/2007 | Riggins et al. | ................. | 717/124 |
| 7,290,245 B2 * | 10/2007 | Skjolsvold | ...................... | 717/125 |
| 7,337,432 B2 * | 2/2008 | Dathathraya et al. | ......... | 717/125 |
| 7,395,456 B2 * | 7/2008 | Klementiev et al. | ........... | 717/124 |
| 7,398,469 B2 * | 7/2008 | Kisamore et al. | ............... | 717/124 |
| 7,421,683 B2 * | 9/2008 | Robertson et al. | ............. | 717/130 |
| 7,712,074 B2 * | 5/2010 | Ren | ................ | 717/125 |
| 7,917,895 B2 * | 3/2011 | Givoni et al. | .................. | 717/124 |
| 8,171,460 B2 * | 5/2012 | Pizzoli et al. | .................. | 717/126 |
| 8,281,286 B2 * | 10/2012 | Nguyen | .......................... | 717/125 |
| 8,347,267 B2 * | 1/2013 | Givoni et al. | .................. | 717/124 |
| 8,543,986 B2 * | 9/2013 | Murthy et al. | ................. | 717/126 |
| 8,549,478 B2 * | 10/2013 | Amichai et al. | ............... | 717/124 |
| 8,589,883 B2 * | 11/2013 | Demant et al. | ................ | 717/125 |
| 2003/0084429 A1 * | 5/2003 | Schaefer | ......................... | 717/125 |
| 2004/0194065 A1 * | 9/2004 | McGrath et al. | .............. | 717/124 |

(Continued)

OTHER PUBLICATIONS

Shehady, R.K., Siewiorek, D.P., A method to automate user interface testing using variable finite state machines, [Online] Jun. 1997, Fault-Tolerant Computing, 1997, Digest of Papers., Twenty-Seventh Annual International Symposium on, [Retrieved from the Internet] < http://ieeexplore.ieee.org/stamp/stamp.jsp?tp=&arnumber=614080&isnumb>pp. 80-88.*

(Continued)

*Primary Examiner* — Thuy Dao
*Assistant Examiner* — Ravi K Sinha
(74) *Attorney, Agent, or Firm* — Blakely, Sokoloff, Taylor & Zafman LLP

(57) ABSTRACT

A method and apparatus for generating dynamic test scripts enables the design and use of testing scripts that are independent of an application and the user interface layout of the application. The method and apparatus store a set of test data, checks and an action list independent from a test script. The test script matches the properties of the test data, checks and action list items with the properties of user interface elements in an application at run-time. The run-time matching allows for the script to be utilized for different applications as well as altered or updated versions of those applications with minimal or no changes to the testing script. This method and system are particularly relevant for the testing of applications using the user interface rather than backend utilities (APIs, services etc.).

15 Claims, 5 Drawing Sheets

(56) References Cited

U.S. PATENT DOCUMENTS

| | | | | |
|---|---|---|---|---|
| 2008/0148235 | A1* | 6/2008 | Foresti et al. | 717/126 |
| 2008/0282231 | A1* | 11/2008 | R et al. | 717/124 |
| 2008/0295076 | A1* | 11/2008 | McKain et al. | 717/124 |
| 2010/0281457 | A1* | 11/2010 | Ren | 717/105 |
| 2010/0318971 | A1* | 12/2010 | Nagle | 717/125 |
| 2011/0016453 | A1* | 1/2011 | Grechanik et al. | 717/125 |
| 2011/0029956 | A1* | 2/2011 | Ledenev et al. | 717/125 |
| 2011/0088018 | A1* | 4/2011 | Foley et al. | 717/131 |
| 2011/0131551 | A1* | 6/2011 | Amichai et al. | 717/125 |
| 2011/0307865 | A1* | 12/2011 | Grieves et al. | 717/124 |

OTHER PUBLICATIONS

Takahashi, J., Kakuda, Y., Effective automated testing: a solution of graphical object verification, [Online] Novemeber 2002, Proceedings of the 11th Asian Test Symposium, [Retrieved from the Internet] <http://ieeexplore.ieee.org/stamp/stamp.jsp?tp=&arnumber=1181725&isnumber=26519> pp. 284-291.*

Atif M. Memon, GUI Testing: Pitfalls and Process, [Online] Aug. 2002, [Retrieved from the Internet] <http://cvs.cs.umd.edu/~atif/papers/MemonIEEEComputer2002.pdf> Total pp. 2.*

Fu, et al.; Inferring Types of References to GUI Objects in Test Scripts; 2009 International Conference on Software Testing Verification and Validation; 2009 IEEE; 10 pages.

Ankur; Descriptive Programming Simplified/Quick Test Professional (QTP); http://mercuryquicktestprofessional.blogspot.com/2006/11/descriptive-programming-simplified.html; 6 pages.

GUI Testing Automation; GUI Testing Handbook; http://www.comparesuite.com/solutions/tests-automation/hbd_gui_test_automation.htm; copyright 2000-2011; 3 pages.

* cited by examiner

DYNAMIC TEST SCRIPTS

FIELD OF THE INVENTION

Embodiments relate to a method and system for testing applications. Specifically, embodiments relate to a method and system for generating dynamic test scripts that are application and user interface independent.

BACKGROUND

Software developers and many software users that customize their software test the software and customizations to the software before releasing or distributing the software. The developers and entities that customize their software test their software manually or spend significant resources creating an automated test script. Several tools exist to assist in the development of test scripts including eCATT by SAP AG of Walldorf, Germany and HP-QTP by Hewlett-Packard of Palo Alto, Calif. However, these tools generate test scripts that are specific to the user interfaces of the applications that they are designed for. Even minor changes to the user interfaces of the applications that the test scripts are designed for can require significant changes in the test scripts to adapt them to the new user interface design.

The test scripts are dependent on the specific layout (object layering/hierarchy, object type, screen coordinates, etc.) of the user interfaces of the applications being tested, because they are often created by recording a set of user actions within the user interface. The actions to be performed are recorded using tracked screen coordinates or the object hierarchy of the user interface object at the position in the screen that is being utilized. This information is recorded as static information that represents the application and user interface state at the time that it is recorded.

The types of actions that are recorded by these test scripts include data input, data output and navigation actions that simulate end user interactions with the application. The automation of the testing process involves the recording of these actions in the test script. The actions can then subsequently be replayed to test an application.

BRIEF DESCRIPTION OF THE DRAWINGS

Embodiments are illustrated by way of example and not by way of limitation in the figures of the accompanying drawings in which like references indicate similar elements. It should be noted that different references to "an" or "one" embodiment in this disclosure are not necessarily to the same embodiment, and such references mean at least "one."

FIG. 4A is a diagram of one example embodiment of a user interface of an application being tested.

FIG. 4B is a diagram of one example embodiment of a user interface of the application being tested after a modification.

DETAILED DESCRIPTION

Figure 1:
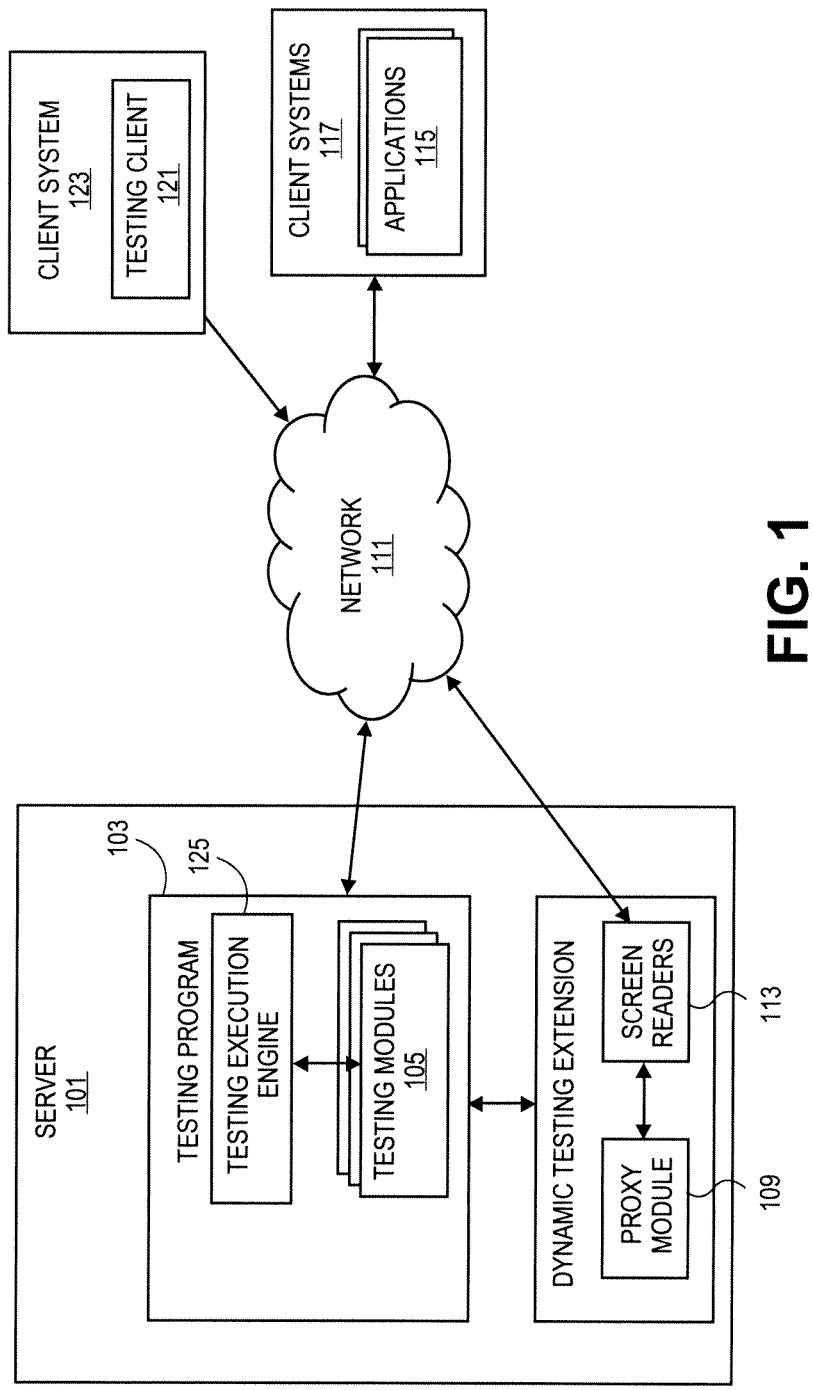
FIG. 1 is a diagram of one embodiment of a system for dynamic test scripting.

FIG. 1 is a diagram of one embodiment of a system for dynamic test scripting. The system may include a server 101 and client systems 117, 123. The server 101 and the client systems 117, 123 can be any type and combination of computer systems including desktop computers, handheld computers, laptop computers, servers, workstations or similar computing devices. The server 101 and the client systems 117, 123 can be in communication with each other over a network 111. The network 111 can be a local area network (LAN), a wide area network (WAN), such as the Internet or similar communication system. For sake of convenience and clarity, a system with a single server 101 and two client systems 117, 123 is illustrated and described. However, one of ordinary skill in the art would understand that the principles, structures and features of the described system can be implemented on any number or combination of networked computer systems.

In one embodiment, the server 101 includes or executes a testing program 103. The testing program 103 enables the design and execution of testing scripts to test local or remote applications 115. The testing program 103 can be accessed and utilized locally or through a remote testing client 121. The testing program 103 includes a testing execution engine 125 and testing modules 105. The testing execution engine 125 loads and executes the testing modules 105. The testing execution engine 125 can communicate directly or indirectly with the testing client 121 and the applications 115 to be tested. The testing engine 125 can also provide an interface for defining and storing testing modules 105 through a testing client 121 or independently.

The testing modules 105 store test scripts and a set of test data, a set of checks and an action list. The test data, checks and action list are defined independent of the screen layout of any application or user interface and independent of the test script. However test data, checks and action list can be specific to the transaction being tested (since it is specific to the business logic). The test data, checks and action list can be stored as separate tables or data structures or within a unified data structure in the form of a test data repository (TDR) such as a test data container (TDC) in eCATT by SAP AG of Walldorf, Germany or any combination thereof. Test data is data to be inserted, filled-in or input into an application through a specified field or user interface element. The test data can be defined by a developer or tester by direct programming or definition through the testing client or similar interface.

Checks are comparisons of expected results of operations of the application with the actual output of the application. The checks can also be defined by a developer or tester by direct programming or definition through the testing client or similar interface. An action list is a navigation sequence or similar set of interactions with an application that can be defined by recording an interaction with the application or by direct programming or definition of the action list by a tester or developer. The developer or tester can also define alternate sets of interactions that can be selected at run-time or under similar circumstances.

The test data, checks and action list are defined to include a set of properties for a corresponding user interface element. This information is utilized to match the test data, checks and actions in the action list with a user interface element of an application to be tested. For example, test data defines data that is to be input into a user interface element of the application. The value to be input is stored along with a set of characteristics or properties of the user interface element the data is to be input into, such as a type of the user interface element (e.g., a text input field), a size, identification infolination (e.g., field name or table name, position in hierarchy of screen objects, etc.) and similar user interface characteristic or property information. In one embodiment, the characteristics or properties of user interface elements exclude screen specific location information to enable the testing to be independent of screen layout. The user interface element with an exact match or a near match can be matched with the test data, check or item from an action list.

The testing program can include or interface with a proxy module 109 and a screen reader 113. These components can be a part of a separate dynamic testing extension 107 or integrated with the testing program 103. The dynamic testing extension 107 can handle the interface between the testing program 103 and the external applications 115 and/or testing client 121. The proxy module 109 can provide a set of user interface specific navigation tools or scripts to be selected and utilized by the screen reader 113 and/or testing design and execution engine 125 when mapping the user interface elements of the applications 115 to test data, checks and action list. At run-time of the testing module 105, the screen reader 113 interfaces with the applications 115 and manages the communication of data between the testing program 103 and the applications 115. The screen reader 113 can retrieve the user interface hierarchy and similar information about the user interface to generate a list of user interface elements and their corresponding properties to be matched with the test data, checks and action list of the testing module.

A client system 117 can include a .NET framework by Microsoft Corporation of Redmond, Wash. to facilitate communication between the screen reader and the application. In some embodiments, the testing program includes or is implemented in conjunction with the above-mentioned eCATT. Any number of client systems 117, 123, applications 115 and testing clients 121 can be part of the system and communicate with the server 101 and testing program 103. In other embodiments, multiple servers 101 and/or instances of the testing program 103 can be part of the system.

Figure 2:
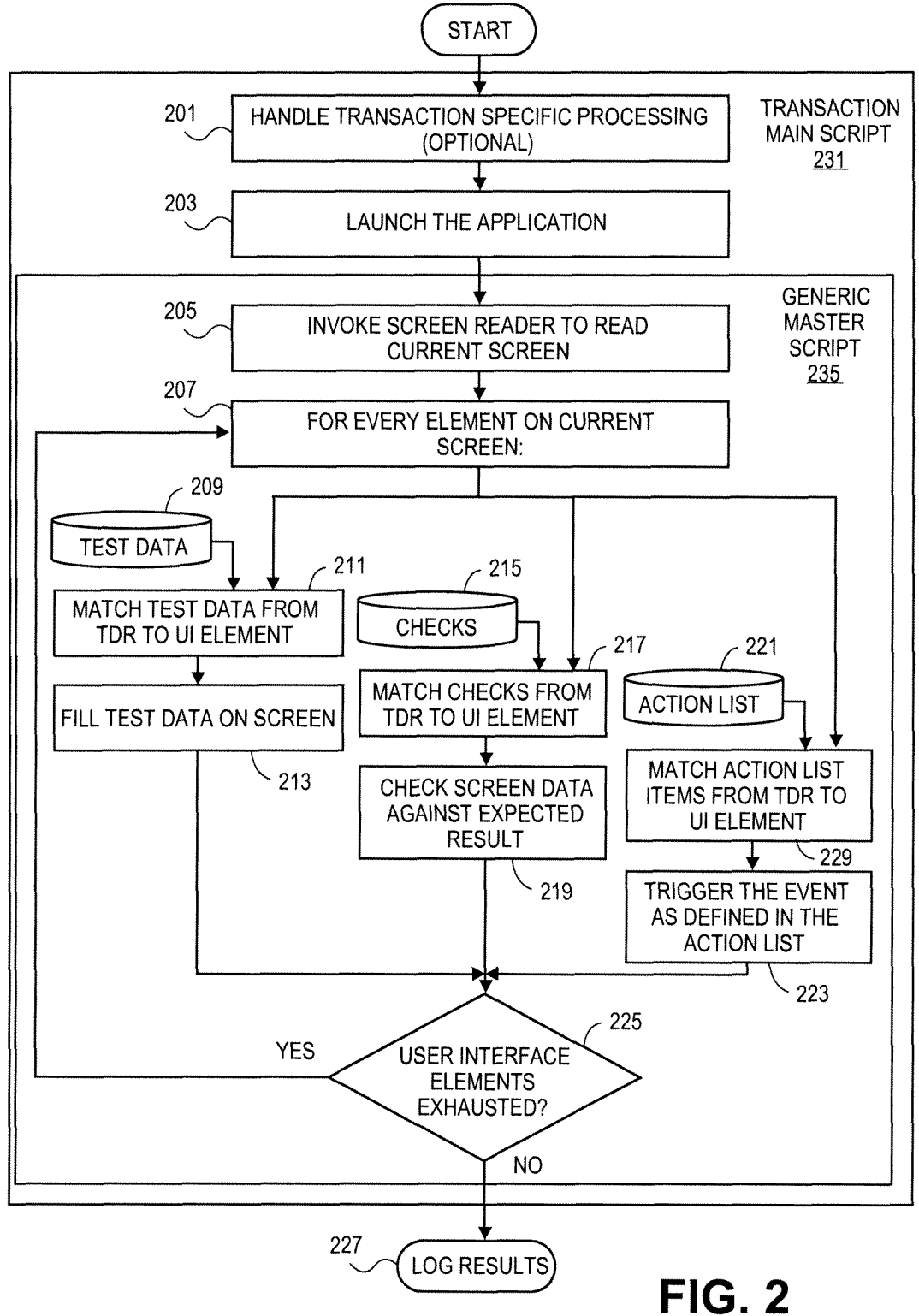
FIG. 2 is flowchart of one embodiment of a process for executing dynamic test scripts.

FIG. 2 is flowchart of one embodiment of a process for executing dynamic testing scripts. In one embodiment, the process is initiated through a testing client or similar interface of the testing program by the selection of a testing module. The testing engine then begins to execute the testing module. In one embodiment, the testing module includes a set of scripts including a transaction main script 231 and a generic masterscript 235. The transaction main script 231 is executed by the testing engine and underlying computer system to manage the interaction between the application to be tested and the testing program. The transaction main script 231 can define a set of transaction specific actions to be executed prior to launching the application (Block 201). Transaction specific actions can include setting some system configuration parameters, data pre-processing, calculation of expected results etc. The transaction main script 231 then launches the application to be tested (Block 203).

The generic master script 235 is then executed and invokes the screen reader to read the current screen of the application (Block 205). The screen reader generates a data structure representing the hierarchy of user interface elements or user interface objects including the basic attributes of the user interface elements such as an identifier, field name, value, status (e.g., changeable, hidden, etc.) and similar attributes. The data structure can be an extensible mark-up language string or document or similar data structure. The data structure can be organized to match the layout of the user interface elements on the screen.

The process iterates through each element on a current screen or user interface of the application (Block 207). The user interface elements can be processed in any order. In one embodiment, the user interface elements are processed sequentially from an upper left position to a lower right position as they occur in the screen. The user interface elements can also be processed in lexicographical order, hierarchical order or similar order. The processing of the user interface elements in this iterative process is independent of any screen location information from the generic master script 235 or transaction main script 231.

For each user interface element identified in the current screen, test data 209 is retrieved from the test data repository or similar data structure and compared to the properties of the user interface element to determine whether there is a match (Block 211). The properties of the user interface element and test data 209 do not include screen location information. In one embodiment, the user interface element and test data 209 can be matched through the use of a unique semantic identifier. A unique semantic identifier can uniquely identify each user interface element independent of its location. The unique semantic identifier can include object hierarchy information or similar information that uniquely identifies a user interface element.

If a match is found then the test data 209 is inserted or filled into the user interface element (Block 213). A match can be an exact match between the properties defined by the test data and the properties defined for the user interface element. However, these properties exclude screen location information enabling the process to handle any reorganization of the user interface elements within a screen including removal, addition and movement of user interface elements between screens.

The interaction with the user interface element to fill in the test data can be performed by use of user interface control specific generic scripts from a library of such scripts in the proxy module or similar component of the system. These generic scripts can be utilized to perform any type of action for any type of user interface element. These user interface control generic scripts and associated library minimize the need to repetitively code interactions with each user interface element in a screen and avoid the need to directly code these aspects into the generic masterscript 235. Thus, test logic (defined by the test case) is completely separated from the test implementation (handled by generic scripts). At run-time a sub-set of test data can be designated or defined by a user to be utilized in the script.

For each user interface element identified in the current screen, checks 215 are retrieved from the test data repository or similar data structure and compared to the properties of the user interface element to determine whether there is a match (Block 217). The properties of the user interface element and checks 215 do not include screen location information. In one embodiment, the user interface element and test data 209 can be matched through the use of a unique semantic identifier. A unique semantic identifier can uniquely identify each user interface element independent of its location. The unique semantic identifier can include object hierarchy information or similar information that uniquely identifies a user interface element.

If a match is found, then the checks 215 are executed to compare the expected value defined in the check against the value retrieved from the user interface element (Block 219). A match can be an exact match between the properties defined by the checks 215 and the properties defined for the user interface element. However, these properties exclude screen location information enabling the process to handle any reorganization of the user interface elements within a screen including removal, addition and movement of user interface elements between screens.

The interaction with the user interface element to execute the check can be performed by use of user interface control specific generic scripts from a library of such scripts in the proxy module or similar component of the system. These generic scripts can be utilized to perform any type of action for any type of user interface element. These user interface control generic scripts and associated library minimize the need to repetitively code interactions with each user interface element in a screen and avoid the need to directly code these aspects into the generic masterscript 235. At run-time a subset of checks 215 can be designated or defined by a user to be utilized in the script.

For each user interface element identified in the current screen, an action list 221 is retrieved from the test data repository or similar data structure and compared to the properties of the user interface element to determine whether there is a match (Block 229). The properties of the user interface element and action list 221 do not include screen location information. In one embodiment, the user interface element and test data 209 can be matched through the use of a unique semantic identifier. A unique semantic identifier can uniquely identify each user interface element independent of its location. The unique semantic identifier can include object hierarchy information or similar information that uniquely identifies a user interface element.

If a match is found with an item in the action list 221, then that item is executed to the operation defined by the action list item on the matching user interface element (Block 223). A match can be an exact match between the properties defined by the action list 221 and the properties defined for the user interface element. However, these properties exclude screen location information enabling the process to handle any reorganization of the user interface elements within a screen including removal, addition and movement of user interface elements between screens.

The interaction with the user interface element to execute the item of the action list 221 can be performed by use of user interface control specific generic scripts from a library of such scripts in the proxy module or similar component of the system. These generic scripts can be utilized to perform any type of action for any type of user interface element. These user interface control generic scripts and associated library minimize the need to repetitively code interactions with each user interface element in a screen avoid the need to directly code these aspects into the generic masterscript 235. At run-time a sub-set of the action list or alternate action lists can be designated or defined by a user to be utilized in the script.

After a user interface element is processed and compared with the test data, checks and action list, it is determined whether all of the user interface elements have been examined or exhausted (Block 225). If further user interface elements remain, then the process continues (Block 207) to iterate through each user interface element. If all of the user interface elements have been traversed, then the process logs the results of the testing (Block 227) and ends. The results can be logged into any type of file, provided to any type of recording program and/or displayed to the user through a testing client or similar interface. This process is activated for each screen of the application that is opened or activated. Actions in the action list may activate additional screens, in which case the process is queued, run in parallel, restarted, nested or similarly managed to accommodate additional or new screens being opened.

Figure 3:
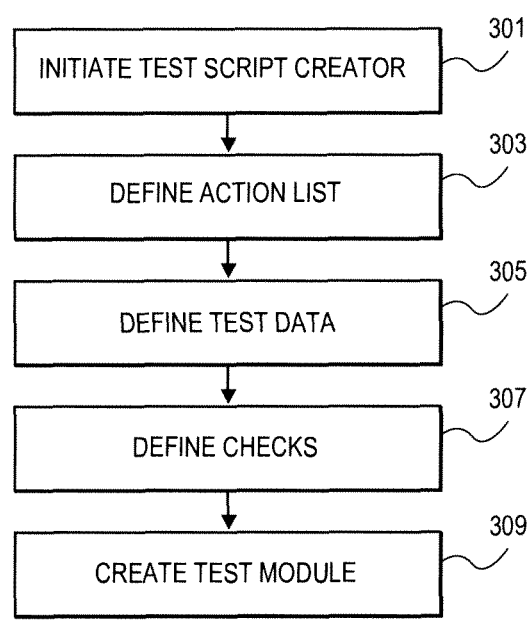
FIG. 3 is a flowchart of one embodiment of a process for generating dynamic test scripts.

FIG. 3 is a flowchart of one embodiment of a process for generating dynamic test scripts. In one embodiment, dynamic test scripts can be generated and stored as testing modules. The testing modules can be designed through a test script creator provided by a testing client or similar application. The test script program can be initiated in the testing program by the external testing client or a test script creator can be executed within the test script client independent of or in communication with the testing program (Block 301). A user such as a developer can define an action list to set forth a set of operations to be performed on an application (Block 303). The action list can be defined by directly entering items for the action list in a table or similar data structure to be stored in a test data repository. The action list can also be defined by recording the actions of a user or developer. The user or developer can also define attributes or characteristics of the user interface elements that correspond to each item of the test data. Alternate action lists can also be defined and stored in the test data repository or testing module. These alternate action lists can be selected by a user at run-time or during set up of testing.

The test data can similarly be directly defined in a table or similar data structure of a test data repository by a user or developer (Block 305). The test data can also be defined by recording the specific fields in a transaction and storing this data in the TDC. The user or developer can also define attributes or characteristics of the user interface elements that correspond to each item of test data. The checks can similarly be directly defined in a table or similar data structure of a test data repository by a user or developer (Block 307). The user or developer can also define attributes or characteristics of the user interface elements that correspond to each item of test data.

Figure 4A:
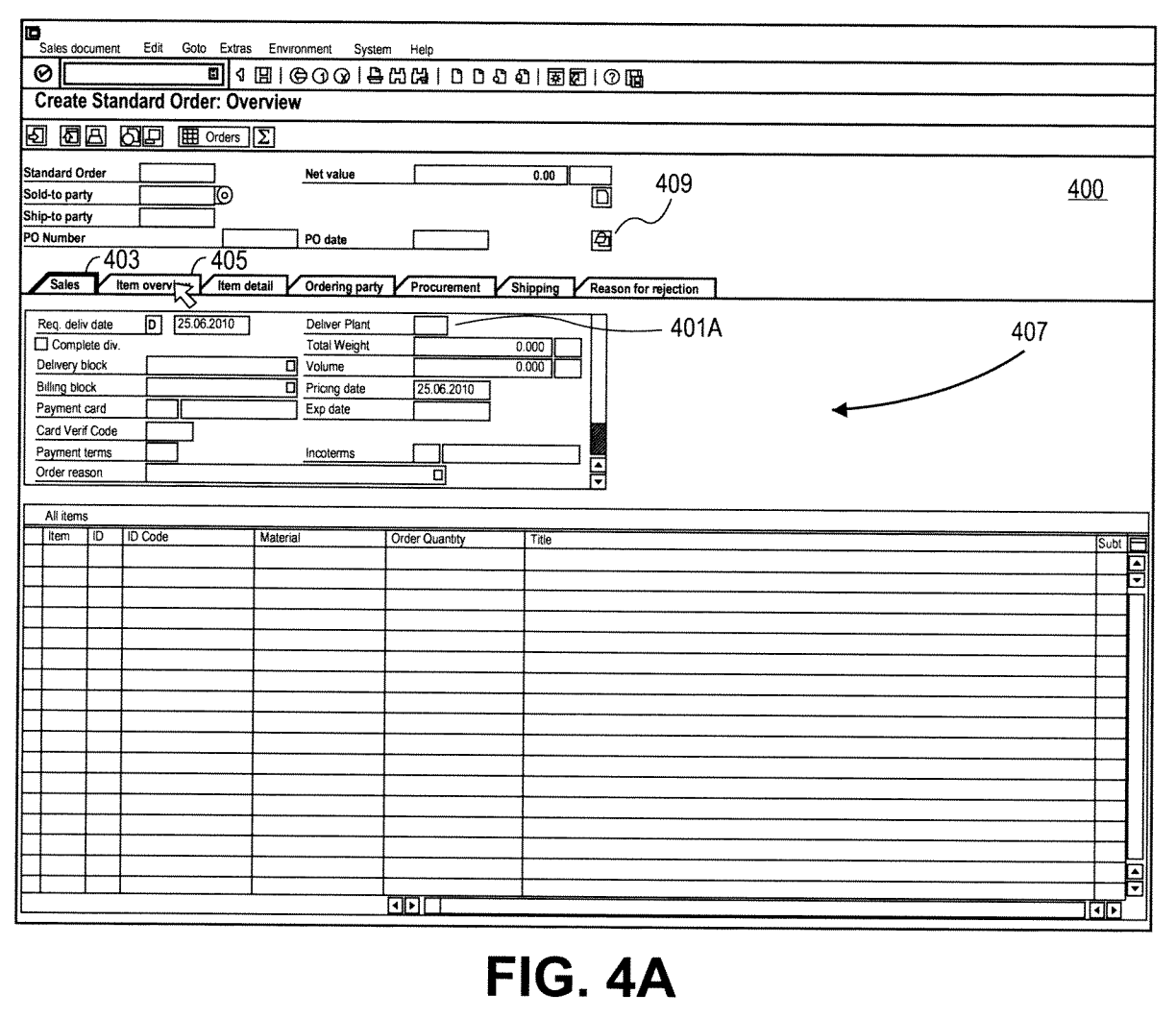

FIG. 4A is a diagram of one example embodiment of a user interface of an application being tested. In the example embodiment, the application is a supply chain management application for managing the transport and delivery of products or goods. The user interface screen 400 has a number of user interface elements 407, such as the Delivery Plant field 401 and search function button 409. Each of these user interface elements 407 has a set of properties that can be utilized to identify the specific user interface element independent of its location. The screen reader can provide this information to the proxy module or testing engine as an extensible mark-up language (XML) document or similar data structure. An example document may include:

```
<?xml version="1.0" encoding="utf-8" ?>
  - <asx:abap xmlns:asx="http://www.sap.com/abapxml" version="1.0">
    - <asx:values>
    - <DATA>
    - <COMPONENT>
      <TYPE>GuiCTextField</TYPE>
      <PROGRAM_NAME>SAPMV45A</PROGRAM_NAME>
      <SCREEN_NO>4001</SCREEN_NO>
      <CHANGEABLE>True</CHANGEABLE>
      <LABEL />Deliver.Plant</LABEL>
      <ID>/app/com[0]/ses[0]/wnd[0]/usr/tabsTAXI_TABSTRIP_OVERVIEW/tabpT\01/ssubSUBSCREEN_BODY:SAPMV45A:4400/ssubHEADER_FRAME:SAPMV45A:4440/ctxtRV45A-DWERK</ID>
      <NAME>RV45A-TXT_VBELN</NAME>
      <IS_TABLE>False</IS_TABLE>
      </COMPONENT>
      </DATA>
    - <MESSAGE>
      <ARBGB>V1</ARBGB>
      <TEXT />
      <TXTNR>212</TXTNR>
      <MSGTY />
      <MSGV1>3020 07</MSGV1>
      <MSGV2>A</MSGV2>
      <MSGV3>1</MSGV3>
      <MSGV4 />
      <PROGRAM_NAME>SAPMV45A</PROGRAM_NAME>
      <SCREEN_NO>4001</SCREEN_NO>
```

```
</MESSAGE>
</asx:values>
</asx:abap>
```

This example document shows only the encoding of the user interface element 401. This data can be used to find and match this user interface element in any updated or modified version of the application.

Similarly, action lists and checks can be defined either directly in code or through recording the interactions of a user or developer with the application. For example, the clicks on tabs 403 with a pointer 405 or similar interactions with the screen 400 can be recorded. This recording identifies the corresponding user interface elements using the properties of the user interface elements to enable reuse of the action list when the application is changed.

Figure 4B:
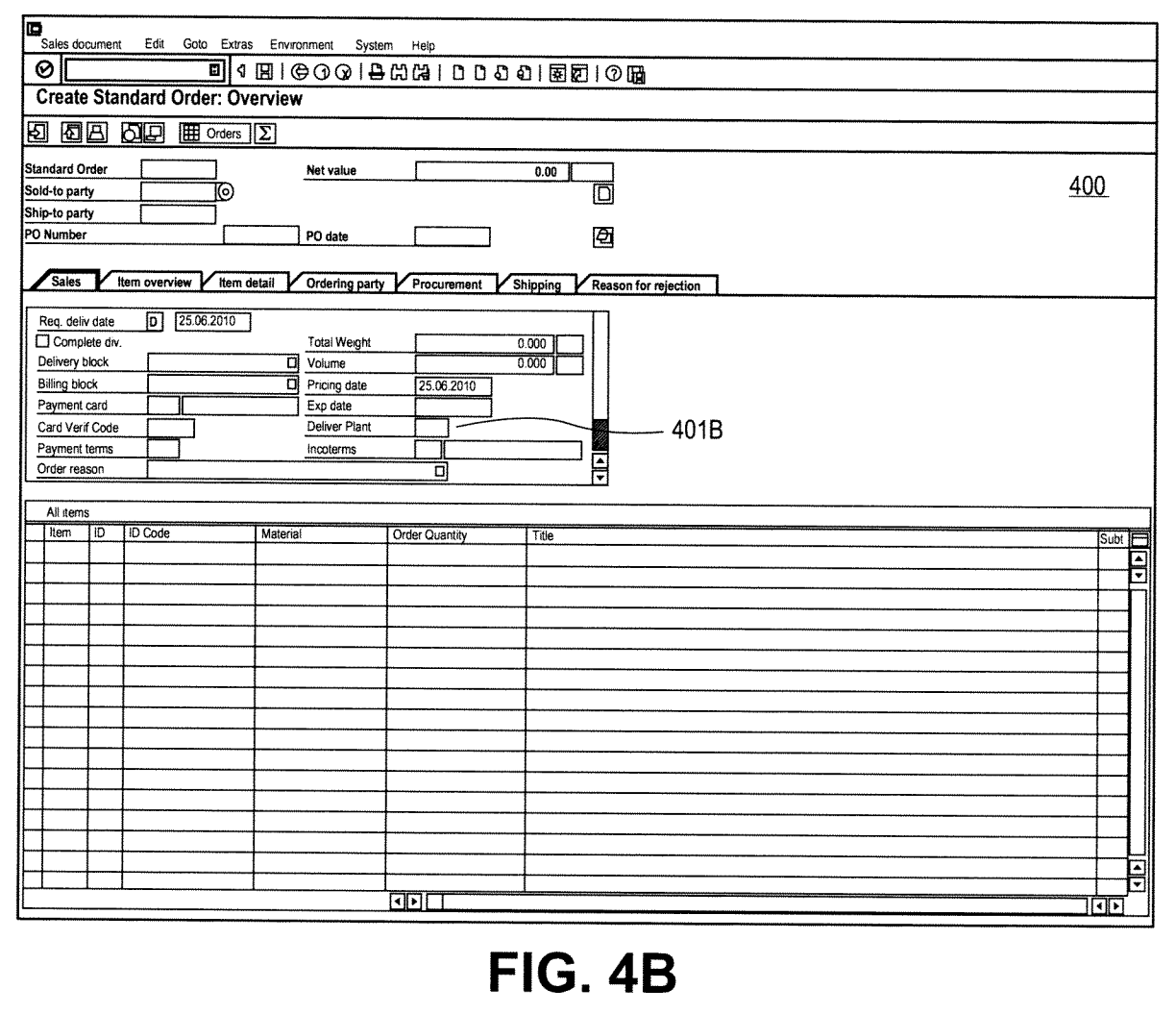

FIG. 4B is a diagram of one example embodiment of a user interface of the application being tested after being modified. The Delivery Plant field 401B has moved to a new location in the user interface 400. If the Delivery Plant field 401B had been identified by its screen location in a test script, then the test script would have failed despite the field only having made a minor change in location on the same screen. However, when using the properties of the user interface element to locate the user interface element, such changes do not affect the execution of the test script. The same properties and relevant portion of the document that describes the user interface element are unchanged for both versions of the application. Thus, the test script can easily find and match the user interface element in its new location without any modification to the test script.

Any number of modifications of this nature can be made to any number of the user interface elements location without requiring any changes to the testing script. The number of changes to the test script that may still be required are minimized and include new test data, checks or action items or the addition or removal of user interface elements.

In one embodiment, the dynamic test scripting system can be implemented as a set of hardware devices. In another embodiment, the system components are implemented in software (for example microcode, assembly language or higher level languages). These software implementations can be stored on a non-transitory computer-readable medium. A non-transitory "computer-readable" medium can include any medium that can store information. Examples of the computer-readable medium include a read only memory (ROM), a floppy diskette, a CD Rom, a DVD, a flash memory, a hard drive, an optical disc or similar medium.

In the foregoing specification, the invention has been described with references to specific embodiments. It will, however, be evident that various modifications and changes can be made thereto without departing from the broader spirit and scope that is set forth in the appended claims. The specification and drawings are accordingly to be regarded in illustrative rather than a restrictive sense.

What is claimed is:

1. A computer-implemented method comprising:
reading a user interface of a first application dynamically at test time without prerecording a hierarchy of the user interface based on user action to determine a first user interface element within the user interface including a first property of the first user interface element;
matching the first user interface element with a first test element based on the first property of the first user interface element at run-time of a test of the first application, the first property not including screen location information;
executing the first test element on the first user interface element
matching a second user interface element of the application with a second test element based on a property of the second user interface element; and executing the second test element on the second user interface element, wherein the second test element and first test element are stored in a test module
reading a user interface of a second application to determine a third user interface element within the user interface including a third property of the third user interface element;
matching the third user interface element with the first test element based on the third property of the third user interface element at run-time of a test of the second application; and
executing the first test element on the third user interface element, wherein the first application and second application are different programs having different user interfaces.

2. The computer-implemented method of claim 1, further comprising:
initiating execution of the first application by a testing program.

3. The computer-implemented method of claim 1, wherein executing the first test element on the first user interface element comprises:
inserting test data from the first test element into the first user interface element.

4. The computer-implemented method of claim 1, wherein executing the first test element on the first user interface element comprises:
triggering an event defined by the first test element through the first user interface element.

5. The computer-implemented method of claim 1, wherein executing the first test element on the first user interface element comprises:
navigating a screen of the first application to initiate a list of actions by iteratively processing each test element of the screen from left-to-right and from top-to-bottom.

6. The computer-implemented method of claim 1, wherein executing the first est element on the first user interface element comprises:
checking a result retrieved from the first user interface element against an expected result defined in the first test element.

7. The computer-implemented method of claim 1, wherein the first property includes a unique semantic identifier.

8. A system comprising:
a testing module defining test data, an action list and a check for testing a function, the testing module excluding screen location information;
a screen reader to obtain user interface data including user interface element data from an application dynamically at test time without a prerecording a hierarchy of the user interface based on user action, wherein the screen reader obtains a user interface hierarchy from the application and generates a list of user interface elements and user interface element properties in response to a request from the testing program for each user interface of the application as it is encountered in testing the application;
a testing program independent of the application and including a plurality of application agnostic test scripts, the testing program to initiate the application and execute the testing module on the application and record a result of the execution, the testing program to match user interface elements of the user interface of the application against the test data, action list and check at run-time of testing the application, the testing program applying the same test data or action list to a user interface element of a first application and a user interface element of a second application, wherein the first application and second application are different programs having different user interfaces; and a processor executing the testing module and testing program.

9. The system of claim 8, further comprising:
a proxy module to identify the screen reader that matches a type of the application.

10. A non-transitory computer readable medium, having instructions stored therein, which when executed cause a computer to perform a set of operations comprising:

loading a test module defining test data, an action list and a check to be applied to a first application;

requesting a list of user interface elements and properties of the user interface elements in a user interface of the first application from a screen reader, the screen reader obtaining the properties dynamically at test time in the absence of a hierarchy prerecorded based on user interaction, the properties excluding screen location;

matching the user interface elements with the test data, the action list or the check based on the properties of the user interface elements at run-time of a test of the first application; and applying the matched test data, action list or check to the user interface elements using application agnostic scripts matching a second user interface element of the application with the test data, action list or check based on a property of the second user interface element, applying the test data, action list or check on the second user interface element;

requesting a list of user interface elements and properties of the user interface elements in a user interface of a second application from the screen reader;

matching the user interface elements with the test data, the action list or the check based on the properties of the user interface elements at run-time of a test of the second application; and applying the matched test data, action list or check to the user interface elements, wherein the first application and second application are different programs having different user interfaces.

11. The non-transitory computer-readable medium of claim 10, having further instructions stored therein, which when executed cause a computer to perform a set of operations further comprising:
initiating execution of the first application.

12. The non-transitory computer-readable medium of claim 10, wherein applying the matched test data comprises:
inserting test data into a first user interface element.

13. The non-transitory computer-readable medium of claim 10, wherein applying the action list comprises:
triggering an event defined by the action list through a first user interface element.

14. The non-transitory computer-readable medium of claim 10, wherein applying the check comprises:
checking a result retrieved from a first user interface element against an expected result defined in the test module.

15. The non-transitory computer-readable medium of claim 10, having further instructions stored therein, which when executed cause a computer to perform a set of operations further comprising:
recording results of the applying in a log file.

* * * * *